Oct. 9, 1962　　　　　R. B. SMITH　　　　3,058,061
AUTOMATIC CHECKOUT CODING SYSTEM
Filed Oct. 18, 1957
2 Sheets-Sheet 1

INVENTOR.
RAYMOND B. SMITH
BY *John A. Duffy*
AGENT

United States Patent Office 3,058,061
Patented Oct. 9, 1962

3,058,061
AUTOMATIC CHECKOUT CODING SYSTEM
Raymond B. Smith, Whittier, Calif., assignor to North American Aviation, Inc.
Filed Oct. 18, 1957, Ser. No. 690,945
5 Claims. (Cl. 324—73)

This invention relates to testing systems and more particularly to a means for matching the correct programmer in an automatic checkout system with the particular device to be tested.

In the checkout of components or subsystems of complex systems such as aircraft electronic systems and the like, either in the field or in the factory, the problem of how to set up the proper test conditions and how to insure that individual components of the subsystems under test are not damaged by improper test set-ups is created. In a checkout system which automatically controls a series of prearranged operations on various types of test devices, the testing of the devices is normally controlled by a plurality of indexing or programming means, each appropriately designed for a single device or article to be tested. Thus, each device has a corresponding programming means associated therewith and placed in the automatic checkout system and the designated test automatically made. Since it is customary to operate checkout equipment with relatively unskilled personnel, there is the likelihood of the mismatching of the programming means with the device to be tested. Mismatching of the device to be tested with the testing equipment by means of an improper programmer may cause serious damage to the device to be tested. Accordingly it is advisable in an automatic checkout system to provide a completely automatic and foolproof system wherein the proper matching of the programmer and the device to be tested is guaranteed regardless of the possible incorrect selection of the programmer.

In the past in automatic checkout systems it has been customary to set up tests by using a large number of manually operated switches similar to the well-known tube checker. These systems have a high probability of error due to the large number of adjustments which must be made by the operator. Unless the operator is highly efficient and skilled there is a strong possibility of the connection of the wrong programming means between the testing means and the device to be tested. Thus, an unreliable system is produced. Another method utilized in past automatic checkout systems has been the employment of jumper cables and keyed connectors so that a component to be tested cannot be plugged into the wrong socket in the testing device. This method has the disadvantage in that the standardization of the connector is impossible and that a large number of connector cables is required. This system has a further disadvantage in that the units to be tested sometimes involve connectors which are impractical to key or otherwise index. Such a connector may be, for example, an etched circuit board connector. Other methods in use in the past are those requiring a card reader, a tape reader, relay system, or combinations of the above-mentioned and other systems. In all of these systems complicated procedures are used to provide a system which is only partially foolproof and still not completely safe from unskilled operators.

The device of the present invention overcomes the above-stated and other disadvantages by providing precision coding resistors in the test device and the programming means which are matched and measured in a bridge circuit so that unless the particular coding resistors are equal size, the programming means will not operate to connect the testing means to the device to be tested. In other words, each device to be tested has a coding resistor which is functionally equal to a coding resistor in one programmer only. A completely automatic and foolproof system is provided wherein the proper matching of the programmer and the unit to be tested is guaranteed. Thus, unless the proper programmer is connected to the device to be tested, the testing means will not operate.

In accordance with the device of this invention, a means is provided for each device to be tested in a checkout system and is matched with a second means which is provided for each one of a series of programming means. The first and second means are compared by comparison means which detects functional identity between the means so that one programmer will fit one test device. Means are provided which are responsive to the comparison means for operatively connecting the testing means to the device to be tested when the first and second coding means are of functional identity as determined by the comparison means. The coding means provided in the device to be tested and the programming means may be, for example, coding resistors whose impedance value is predetermined so that each component or subsystem to be tested has a coding resistor with a unique value in impedance. The programming means corresponding to each device to be tested contains another coding resistor which is identical in value with its corresponding coding resistor in the test device. When the device to be tested and the programming board are connected into the test console the two coding resistors of the test device and the programming board form two legs of a bridge circuit, the other two legs being formed by two resistors of fixed values. In this manner, if the appropriate programming means has been chosen for a particular device, a balanced condition in the bridge will exist, thus indicating the functional identity between the coding resistor in the test device and its corresponding coding resistor in the programming means. If a card reader or tape reader or other system which does not allow the addition physically of the coding resistor to the programming means is selected, a simple converter can be supplied to convert from coded information, as, for example, might be punched in a paper tape or card to an equivalent coding resistor. The output of the bridge circuit is connected to a null indicating amplifier which in turn causes a protective relay to be energized or de-energized connecting or disconnecting the testing means to the device to be tested according to whether a balanced or unbalanced condition is obtained in the bridge. If an incorrect program board containing a coding resistor which is not equal in value with the coding resistor in the test device is selected, an unbalance in the bridge will result, thereby causing the relay to be energized so that no connection is made between the testing means and device to be tested, thus preventing incorrect testing. Thus, a versatile and foolproof system is provided which is applicable to any automatic test equipment where programming or indexing means are provided to test various components or subsystems. A simple method is provided which can be utilized in any type of automatic checkout system.

It is therefore an object of this invention to provide an improved selection system for automatic checkout systems.

It is another object of this invention to provide a means in an automatic checkout system for insuring the connection of the correct programmer to the device to be tested.

It is still another object of this invention to provide coding means in a device to be tested and coding means in a programmer and means for matching said coding means to insure the connection of the correct programmer board to the test device.

It is a further object of this invention to provide a plurality coding means associated with components to be tested and a plurality of coding means associated with programming means and means for comparing the coding means to insure the correct testing to be made on each test device in accordance with the programming means selected for each test device.

It is a still further object of this invention to provide an improved checkout system.

It is a further object of this invention to provide precision coding resistors in a bridge circuit which are connected in a device to be tested and programming means to insure that mismatching will not occur between testing means and the device to be tested.

Other objects of this invention will become apparent from the following description taken in connection with the accompanying drawings in which—

Figure 1:
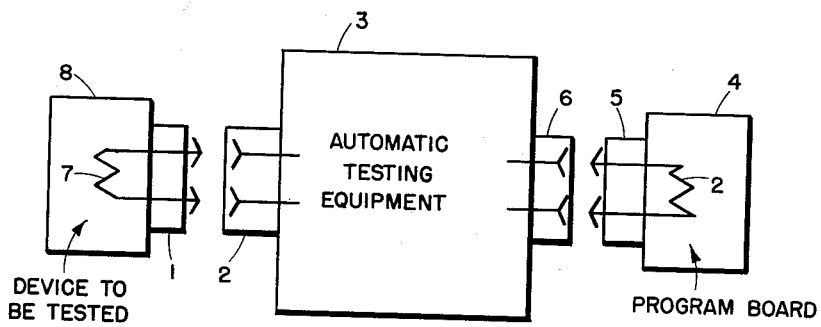
FIG. 1 is a block diagram illustrating the location of the coding means of the invention.

Referring now to FIG. 1, there is shown a block diagram illustrating the location of the coding devices of this invention. The device to be tested is connected by means of a connector 1 to receptacle 2 which is located in the panel of automatic testing equipment 3. Correspondingly, programmer 4 is connected by connector 5 to receptacle 6 of automatic testing equipment 3. Device to be tested 8, which may be, for example, a component subsystem electronic amplifier or a major black box of an electronic system, has located therein coding resistor 7. The value of resistor 7 is peculiar to device 8, the unit to be tested. For example, assume there are 150 devices similar to device to be tested 8 in a given system. There will be 150 coding resistors, one for each device to be tested, similar to resistor 7, each differing in value. Each device to be tested is assigned a resistance value for its coding resistor which is discrete and easily identifiable with respect to other coding resistors. In one embodiment of the invention the values of the resistors such as resistor 7 are selected for the devices to be tested by varying the entire range of values by approximately 5 percent permitting ease of separation in the electrical circuitry which measures the value of the resistors. On programmer 4, corresponding to each device to be tested, there is mounted resistor 2 which is identical in value with resistor 7 mounted in the device to be tested 8. When device to be tested 8 and programmer 4 are plugged into automatic testing equipment 3, resistors 7 and 2 form two legs of an ordinary Wheatstone bridge (not shown in FIG. 1), the other two legs being formed by two fixed resistors in the automatic testing equipment whose values are determined to be approximately the geometric means of the extremes of the resistor value used for all of the coding resistors for the devices to be tested. In this manner, if the appropriate programmer has been chosen for a particular component, a balanced condition in this bridge will result. If the incorrect programmer has been selected, the bridge will detect a difference in value between resistor 7 and resistor 2 which will prevent the connection in the automatic testing equipment between the testing means and the device to be tested. This insures that no power can be applied to any of the components in device to be tested 8 and therefore no damage can be done if an incorrect programmer is connected to automatic testing equipment 3. It is to be noted that device to be tested 8 may be of any type component. It is immaterial what the nature of this device may be, i.e., whether it is a servo component, an electrical circuit, or any other similar device. It is also immaterial whether the test to be performed is an electrical test. The important thing to note is that coding resistor 7, which forms an auxiliary part of device to be tested 8 and whose value codes or dictates the test to be made by being compared to coding resistor 2 in the programmer, provides an automatic and foolproof system insuring that the correct programmer will index and supply the correct testing to the device to be tested at all times. In the preferred embodiment of the present invention, programmer 4 which provides the programming or indexing means selecting the testing to be done in automatic testing equipment 3 on test device 8 is in the form of a program board which contains holes punched therein and jumpered together with electrical wires and other components in accordance with the programming predeterminedly provided. The programmer, also called a patch board, establishes the test conditions for the device to be tested with which it is associated by means of built-in jumpers or electrical connections between the holes in the programmer. Connector 5 of programmer 4 contains a plurality of pins which meet with receptacle 6 in automatic test equipment 3 of the checkout panel. Any desired combination of connections may be made between the pins. Small components such as resistors or capacitors, if necessary, may be mounted on the program board. There is one program board for each device to be tested. Each programmer contains a coding resistor identical in value of impedance to the coding resistor in the device to be tested to which it is associated.

Figure 2:
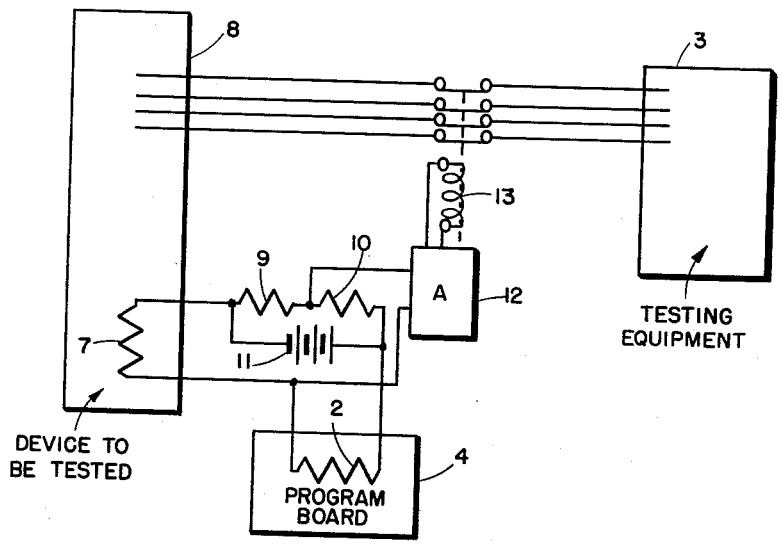
FIG. 2 is a schematic diagram of the electrical circuit of the invention.

Turning now to FIG. 2, there is shown a schematic diagram illustrating the electrical circuit of the invention which provides the necessary indication of the functional identity between the coding resistor in the device to be tested and the corresponding coding resistor in the programmer. When programmer 4 and device to be tested 8 of FIG. 1 are connected as shown in automatic testing equipment 3, resistor 7 in device to be tested 8 and resistor 2 in programmer 4 are connected as shown in FIG. 2. Resistors 9 and 10 are connected together with resistors 7 and 2 to form an ordinary Wheatstone bridge with resistors 9 and 10 having impedance values which are selected to be approximately the geometric means of the extremes of the various resistance values used for coding resistors in the devices to be tested. Direct-current power supply 11 provides the power for the bridge circuit comprising resistors 2, 7, 9, and 10. The output of the bridge circuit is taken from a point in common between resistors 9 and 10 and at a point in common between resistors 2 and 7 and connected to amplifier 12. Amplifier 12 is a null indicating amplifier which actuates the coil of relay 13 when an unbalance exists in the bridge circuit caused by a difference in impedance value between resistor 2 and resistor 7. Thus, if an incorrect programmer is selected resistor 2 will have a different value from resistor 7 and an output signal from amplifier 11 will actuate the coil of relay 13. The connections between testing equipment 3 and device to be tested 8 are all made through the normally closed contacts of relay 13. Should an output from the bridge circuit into amplifier 12 indicate a difference in value between resistor 7 and resistor 2, thereby indicating that an incorrect programmer has been connected to the system, the contacts of relay 13 open, thereby preventing any connection between test equipment 3 and device to be tested 8. Other auxiliary circuitry such as indicating lights may be provided to indicate to the operator that an incorrect or correct program board has been selected. Also other auxiliary circuitry may be provided to guarantee failsafe operation to guard against possible damage due to failure of the bridge power supply or amplifier.

Figure 3:
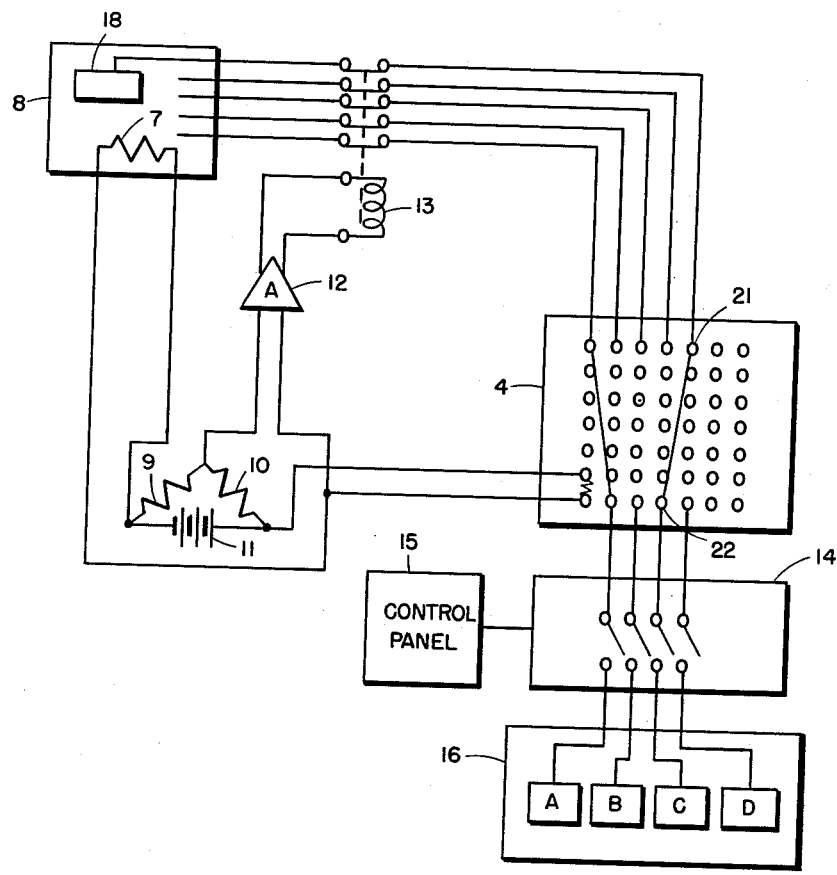
FIG. 3 is a schematic diagram of a specific embodiment showing the utilization of the coding resistors in a typical automatic checkout system.

Turning now to FIG. 3 there is shown in schematic block diagram a particular application of the coding system to a typical automatic check-out system. In FIG. 3, resistors 9 and 10 and power supply 11 may be located in test console 3. Resistor 7 is located in test device 8 which is connected through normally closed contacts of relay 13 to various pins on programmer 4. Other pins of programmer 4 are connected through switching equipment 14 which is controlled by control panel 15 to testing equipment 16. Control panel 15 controls switch 14 and may be either manually or automatically operated. Testing equipment 16 is provided with blocks A, B, C, and D, each of which represents a particular testing operation to be performed. Amplifier 18 in device to be tested 6 is shown for illustration purposes. Amplifier 18 is connected through the contacts of relay 12 to pin 21 of programmer 4. Pins 21 and 22 of programmer 4 are electrically connected. Pin 22 is inserted through switch 14 to block D of testing equipment 16.

In operation, if programmer 4 is the correct programmer for device to be tested 8, the bridge circuit will detect functional identity between coding resistor 7 and in device to be tested 8 and coding resistor 2 in programmer 4. Null amplifier 12 will not actuate relay 13 permitting the input of amplifier 18 to be connected to pin 21 of programmer 4. Pin 22, connected to pin 21, further continues the electrical circuit to switch 14. When control panel 15 closes switch 14, block D of testing equipment 16 is electrically connected to amplifier 18 to perform the predetermined test function thereon.

Now assume that programmer 4 in FIG. 3 is the incorrect programmer. Connecting block D to amplifier 18 may result in damage to amplifier 18 because the test function performed by block D is not the test function desired. The circuit of FIG. 3 will prevent such an erroneous connection in the following manner: A difference in value between coding resistor 7 in device to be tested 8 and coding resistor 2 in programmer 4 (which is assumed to be an incorrect programmer) is detected by the bridge circuit and amplifier 12, responsive thereto, actuates relay 13 opening the circuit between amplifier 18 and pin 21 of programmer 4. Thus it can readily be seen that until the correct programmer is used, no tests will be performed on device to be tested 8.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a test system, testing means, a plurality of programmers for selecting tests to be performed by said testing means on a device to be tested, a first resistor for identifying said device to be tested, a plurality of subsequent resistors for identifying said programmers, means for comparing impedances of said first resistor and said subsequent resistors, and control means responsive to said comparison means for connecting said testing means to said device to be tested when said first resistor is equal in impedance to one of said subsequent resistors.

2. The combination recited in claim 1 wherein said comparison means comprise a pair of resistors operatively connected to said first resistor and each of said subsequent resistors to form a bridge circuit, the output of said bridge circuit connected to said control means whereby said testing means is connected to said test device when the output of said bridge circuit is zero.

3. A testing system comprising a plurality of test devices, testing means, a plurality of programmers for determining the nature of a plurality of testing operations to be performed by said testing means on each of said test devices, a bridge circuit having four legs, one leg comprising a resistor indicative of said test devices, a second leg comprising a resistor indicative of one of said programmers, the output of said bridge circuit being an indication of the impedance ratio of said first and second legs of said bridge circuit, control means responsive to the output of said bridge circuit, and switch means connecting said testing means to said test device and responsive to said control means whereby said testing means is connected to said test device when the output of said bridge circuit is zero.

4. In testing apparatus for testing a selected one of a number of different devices and having testing means and a plurality of programming means each defining the nature of a different one of a plurality of testing operations to be performed by said testing means, each said testing operation being uniquely individual to a different one of said devices, the improvement comprising a plurality of first coding resistors for uniquely identifying each said different device to be tested, a plurality of second coding resistors for uniquely identifying each said programming means, means for comparing said first and second coding resistors, and control means responsive to said comparison means for operatively connecting said testing means to said one test device upon indication of identity between two said resistors of said device and of said programming means.

5. In a test system having testing means, programming means for determining the nature of a plurality of testing operations to be performed by said testing means, a device to be tested, a first resistor for identifying said device to be tested, a second resistor for identifying said programming means, third and fourth resistor connected to said first and second resistor to form a bridge circuit for detecting functional identity between said first and second resistors, and control means connected to the output of said bridge circuit for operatively connecting said testing means to said device to be tested.

References Cited in the file of this patent

UNITED STATES PATENTS

| 2,468,398 | Griffin | Apr. 26, 1949 |
| 2,892,153 | Neill | June 23, 1959 |

FOREIGN PATENTS

| 709,737 | Great Britain | June 2, 1954 |
| 167,947 | Australia | July 12, 1956 |

OTHER REFERENCES

"Automatic Circuit Tester," Stahl et al., Electronics, October 1954, pp. 136–39.